June 5, 1962  B. MURRAY  3,038,030
MORSE-TO-BINARY CODE TRANSLATOR
Filed Nov. 12, 1959  8 Sheets-Sheet 1

INVENTOR.
BRADLEY MURRAY
BY John M. Calmeyde
ATTORNEY

June 5, 1962  B. MURRAY  3,038,030
MORSE-TO-BINARY CODE TRANSLATOR
Filed Nov. 12, 1959  8 Sheets-Sheet 2

INVENTOR.
BRADLEY MURRAY
BY
ATTORNEY

June 5, 1962  B. MURRAY  3,038,030
MORSE-TO-BINARY CODE TRANSLATOR
Filed Nov. 12, 1959  8 Sheets-Sheet 3

INVENTOR.
BRADLEY MURRAY
BY
ATTORNEY

June 5, 1962

B. MURRAY 3,038,030

MORSE-TO-BINARY CODE TRANSLATOR

Filed Nov. 12, 1959

INVENTOR.
BRADLEY MURRAY

BY
ATTORNEY

June 5, 1962 B. MURRAY 3,038,030
MORSE-TO-BINARY CODE TRANSLATOR
Filed Nov. 12, 1959 8 Sheets-Sheet 5

Fig.8

INVENTOR.
BRADLEY MURRAY
BY
ATTORNEY

June 5, 1962   B. MURRAY   3,038,030
MORSE-TO-BINARY CODE TRANSLATOR
Filed Nov. 12, 1959   8 Sheets-Sheet 7

Fig. 10

INVENTOR.
BRADLEY MURRAY
BY John M. Calmayde
ATTORNEY

June 5, 1962  B. MURRAY  3,038,030
MORSE-TO-BINARY CODE TRANSLATOR
Filed Nov. 12, 1959  8 Sheets—Sheet 8

|  | FLIP-FLOPS | | | | AND GATE "6" |
| --- | --- | --- | --- | --- | --- |
| PULSES | 1 | 2 | 3 | 4 | OPEN |
| 1 | 0→1 | 0 | 0 | 0 | * |
| 2 | 1→0 | 0→1 | 0 | 0 | |
| 3 | 0→1 | 1 | 0 | 0 | |
| 4 | 1→0 | 1→0 | 0→1 | 0 | |
| 5 | 0→1 | 0 | 1 | 0 | * |
| 6 | 1→0 | 0→1 | 1 | 0 | |
| 7 | 0→1 | 1 | 1 | 0 | |
| 8 | 1→0 | 1→0 | 1→0 | 0→1 | |
| 9 | 0→1 | 0 | 0 | 1 | |
| 10 | 1→0 | 0→1 | 0 | 1 | |
| 11 | 0→1 | 1 | 0 | 1 | |
| 12 | 1→0 | 1→0 | 0→1 | 1 | |
| 13 | 0→1 | 0 | 1 | 1 | |
| 14 | 1→0 | 0→1 | 1 | 1 | |
| 15 | 0→1 | 1 | 1 | 1 | |

*Fig. 11*

INVENTOR.
BRADLEY MURRAY
BY John M. Calimafde
ATTORNEY

United States Patent Office
3,038,030
Patented June 5, 1962

3,038,030
MORSE-TO-BINARY CODE TRANSLATOR
Bradley Murray, % Georgetown Preparatory School,
Garrett Park, Md.
Filed Nov. 12, 1959, Ser. No. 852,547
21 Claims. (Cl. 178—26)

This invention relates to a Morse code translator, and more particularly to a Morse-to-binary code translator utilizing only standard digital computer components.

A translator, or converter, for converting Morse signals into binary code is known using analogue techniques and a shift register. The known device is relatively complicated in circuitry and, therefore, subject to errors which are usually associated with complex mechanisms and electronics.

Accordingly, it is a primary object of this invention to provide a translator for converting Morse-to-binary code, utilizing, however, only digital techniques and including a multi-input binary converter. The translator of the invention is simpler than the prior device and requires fewer components.

It is another object of the invention to provide a counter for generating pulses indicative of dashes and dots in the ratio of 2:1.

It is another object of the invention to provide a converter capable of producing correct digital information, notwithstanding deviations in dot and dash durations of up to 33 percent from the ideal.

It is a further object of the invention to provide a converter capable of producing correct digital information notwithstanding a deviation in dot duration of up to 33 percent from the ideal, and a deviation in dash duration having practically no upper limit.

In accordance with an aspect of the invention, there is provided a Morse code to binary code converter comprising a pulse generator for generating "start" and "finish" pulses identifying, respectively, the beginning and end of a Morse character. A "line" counter is coupled to the generator and is adapted to produce a given number of pulses in response to "start" and "finish" pulses indicative of a "dot" and a different number of pulses in response to "start" and "finish" pulses indicative of a "dash." The output of the "line" counter is coupled to a multi-stage binary counter which includes a control gate for each binary counter stage. The gates are conditioned in sequence by a conditioning circuit operative in response to successive "finish" pulses. The gates are coupled to the output of the "line" counter and a conditioned gate is operative in response to pulses indicative of a "dot" or "dash" for altering the state of the associated counter stage, whereby the final states of the counter stages constitute a binary code equivalent of a Morse code letter.

The above-mentioned and other features and objects of this invention and the manner of attaining them will become more apparent and the invention itself will be best understood by reference to the following description of an embodiment of the invention taken in conjunction with the accompanying drawing, wherein:

In order that the description of the invention may be clearly understood, a brief description of the "basic building blocks" of the decoder will first be given.

Referring now to FIG. 1, the four fundamental building blocks are diagrammatically illustrated, which diagrams shall be used throughout the other figures. These circuits are: the flip-flop (FIG. 1A), the univibrator (one-shot, or monostable trigger) (FIG. 1B), the logic AND gate, and the logic OR gate.

The flip-flop (FIG. 1A) has three inputs: the reset input (A), which resets the flip-flop to the off, or 0, state; the set input (B), which sets the flip-flop to the on, or 1, state; and the complementary (binary) input (C), which causes the flip-flop to change state on successive pulses. There are four outputs, two of which produce steady-state signals, and two of which produce pulses, as indicated by the capacitors. The two outputs marked "a" are the 0 outputs, producing respectively an output pulse when the flip-flop changes from 1 to 0, and a steady-state, gate-enabling signal when the flip-flop is in the 0 state. The opposite obtains for the leads marked "b."

The univibrator (FIG. 1B), represented by a square marked U–V, has a single input and single output. It is used for pulse-delay purposes.

The AND and OR gates (FIGS. 1C, 1D) are represented by rectangles of any convenient size, with inputs represented by in-going arrows, outputs by out-going arrows. No distinction is made between active and passive gates, since such a distinction has no bearing on the general circuit description.

*Morse-to-Pulse Converter*

Figure 1A:
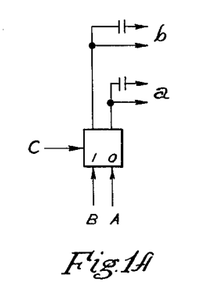
FIGURES 1A–1D and 2 are diagrammatic illustrations of logic blocks employed in the invention.
Figure 1B:
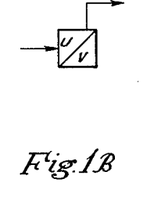
Figure 1C:
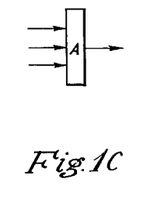
Figure 1D:
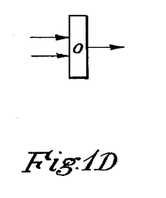
Figure 2:
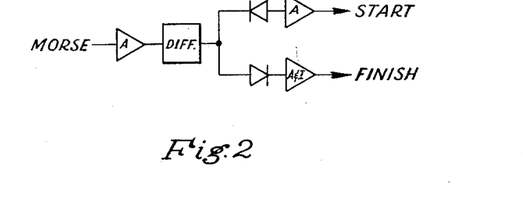

The first stage of the decoder converts the Morse signal into groups of pulses suitable for the counting circuits to follow. In order to define more sharply the start and finish of any Morse character, the characters are made to generate "start" and "finish" pulses by the circuit of FIGURE 2. The Morse characters are fed into an amplifier biased to cutoff (or, if advisable, into an amplifier operating at saturation). The output of the amplifier is differentiated by a standard R-C circuit, so that the start of a Morse character will generate negative-going signals, and the end of a character positive-going signals, or vice versa. The negative pulses are amplified, and the positive pulses are amplified and inverted for use in the decoding circuits. The diodes separate the two kinds of pulses.

The Morse characters are converted into pulses by using the "start" and "finish" pulses to gate an oscillator or pulse generator.

If the code characters are used to gate a generator, the number of pulses generated for a long and short will be in the ratio of 3:1, since this is the time-duration ratio of the ideal Morse code. A 3:1 pulse ratio would, however, introduce complexity in the second stage, where the pulses are converted into a binary code. For minimum complexity, therefore, the pulses are generated having a 2:1 ratio.

*The "line" counter.*—The term "line" is used to designate the presence of a Morse character; the term "space" to designate its absence, as in the spaces between characters of a letter, between letters, and between words.

Figure 3A:
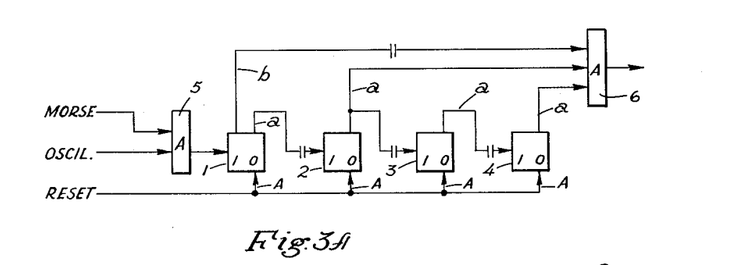
FIGURES 3A and 3B are schematic diagrams of two forms of a "line" counter.
Figure 3B:
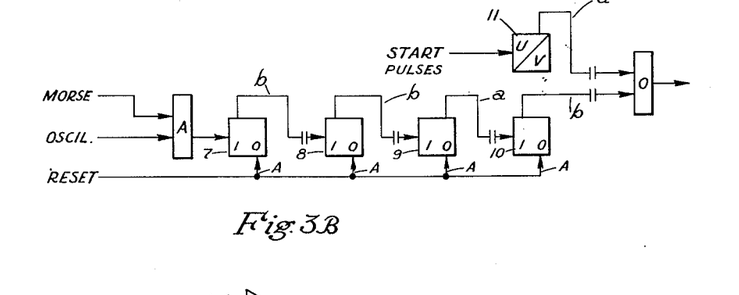

FIGURES 3A and 3B show two counters designed to give a single output pulse for a dot, and two output pulses for a dash. Each counter allows the Morse character to deviate from the ideal length of a dot or dash.

Figure 11:
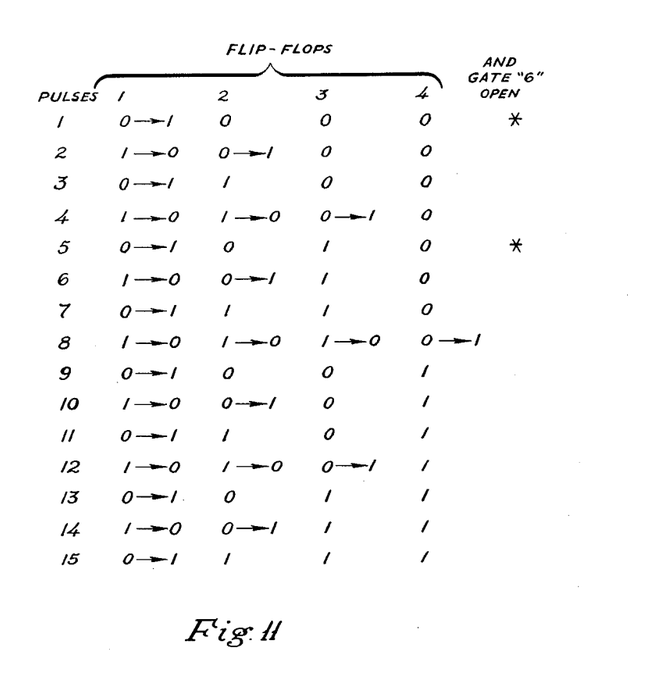
FIGURE 11 is a chart showing the condition of each flip-flop in the "space" counter of FIGURE 3A during the application of fifteen successive input pulses.

In FIGURE 3A, four flip-flops 1, 2, 3 and 4 are connected in a conventional binary counter. An input AND gate 5 is conditioned by the Morse characters (i.e., by the first and finish pulses described above). An oscillator is adjusted to a frequency or pulse repetition rate such that the dot of ideal length will gate three pulses into the counter, and a dash of ideal length nine pulses. The output from flip-flop 1 is connected over a "b"-lead to an AND circuit 6 having three input leads; an output pulse, therefore, is applied to the gate on input pulses 1, 3, 5, 7, 9, 11, 13, 15. In FIGURE 11 the applied pulses and their effect on the flip-flops are charted for ease in following the sequence of operation.

In the illustrated embodiment, the AND gate 6 is also controlled by the outputs from flip-flops 2 and 4. The second flip-flop permits pulses to pass only when it is in its 0 state—it conditions the gate for pulses 1, 5, 9, and 13. The third flip-flop permits pulses to pass only when it is in its 0 state—it conditions the gate for pulses 1 through 7. When these three flip-flops are combined, only the 1st and 5th pulses can pass.

Since the first input pulse of the group of three generated by a dot produces an output pulse a dot can be about 33 percent shorter than the ideal. It is recalled that a dot is indicated by one pulse. And, since a second output pulse is not generated until the 5th input pulse, the dot can be about 33 percent longer than the ideal. The ideal dash will generate 9 input pulses. In this counter, the dash can be short enough to produce only 5 (giving the second output pulse, indicating a dash is being received) and long enough to generate 15 input pulses (beyond 15 the cycle is repeated, and 3 output pulses would be generated, causing error).

The clearing or resetting of the counter does not produce a false output pulse, for there can be no output unless the first flip-flop 1 changes from "0" to "1." If the first flip-flop is in the 0 state when the reset pulse is applied, it does not change state, and no pulse will appear across the capacitor. And, if it is in the 1 state, the reset pulse changes it to 0.

The counter of FIGURE 3B is an improved embodiment especially as to allowable deviation from the ideal code. The four flip-flops 7, 8, 9 and 10 of this counter are interconnected differently from the counter of FIGURE 3A. The connections as indicated make the counter a scale-of-five, that is, the fifth input pulse produces an output pulse. The method of obtaining various scaling ratios is known and is described in an article entitled "A Variable Binary Scaler," I.R.E. Transactions on Electronic Computers, vol. EC-4, No. 2 (June 1955), pp. 70–74, written by Bradley Murray. This counter is different from the counter of FIGURE 3A in two important respects: the inclusion of univibrator 11 and the binary flip-flop stage 10.

The univibrator 11 is employed to delay the "start" pulse, since this start pulse is also used to clear certain sections of a second part of the decoder. The delay time of the univibrator should be adjusted to about the same duration as the time between pulses of the oscillator when it is operating at its maximum frequency. The reason for this is explained below.

The purpose of the fourth binary stage 10 is clear from an examination of the operating sequence of the scale-of-five counter: 0000, 1110, 0110, 1010, 0010, 1101, 0101, 1001, 0001, 1111, 0111, 1011, 0011, 1100, 0100, 1000, 0000. An output pulse is generated on the "a" lead of the third flip-flop 9 when it changes from state 1 to state 0. This change takes place on the 5th and 9th input pulses. Thus, if the duration of a dash were even slightly greater than the ideal, three output pulses, instead of two, would be generated by the "line" counter through the OR circuit indicated: one by the "start" pulse, and two by the scale-of-five counter. By taking the output from the "b" lead of flip-flop 10, however, an output pulse is obtained from the OR circuit only on the 1st, 5th and 21st input pulses—that is, the delayed "start" pulse, and when the fourth flip-flop 10 changes state from 0 to 1. This means that, practically speaking, there is no upper limit on the deviation of a dash from the ideal. The lower limit is the same as for the first counter described. The lower limit of a dot is practically unlimited, since it need be long enough only to generate a short pulse, which, in current computer design, is less than a microsecond. The upper limit of a dot is the same as for the first circuit described.

*The "space" counter.*—It is necessary to distinguish between three different kinds of spaces: the short space, equal in duration to one dot, and used to indicate the space between characters of a letter; the longer space, equal in duration to three does, or a dash, and used to indicate the space between letters; and the long space, equal in duration to six dots or two dashes, and used to indicate the space between words.

Figure 4A:
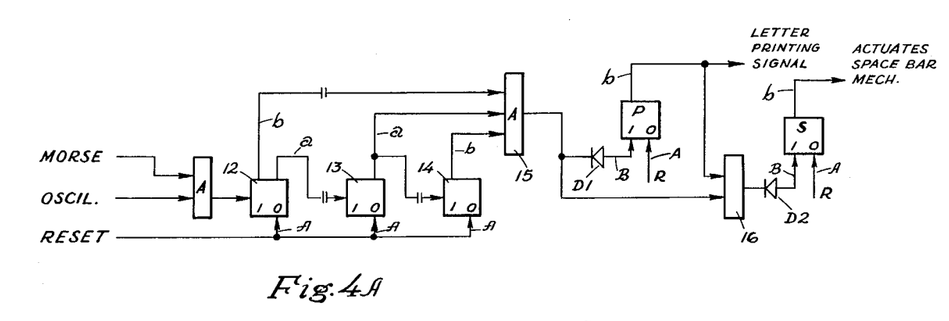
FIGURES 4A and 4B are schematic diagrams of two forms of "space" counter.
Figure 4B:
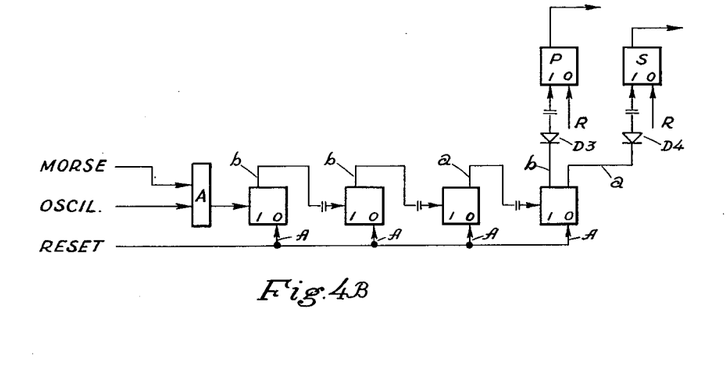

Two counters for distinguishing spaces are shown in FIGURES 4A and 4B. These counters are basically the same as those used for the "line" counter. In FIGURE 4A, the pulses from first flip-flop 12 are gated by the second and third flip-flops 13, 14, so connected that only the 5th and 13th input pulses generate effective output pulses. A pulse generated by a short space is not required, since a "finish" pulse can supply its functions. The ideal-length letter space will gate 9 input pulses to the counter, and the 5th of these produces an output pulse. The ideal-length word space will gate in 18 pulses, and the 13th of these produces the second output pulse. When the first output pulse is passed by the AND circuit 15, it sets the "print" flip-flop P to its 1 state. This flip-flop has a number of functions besides producing a letter-printing signal. The only one to be noted here is that it conditions an AND gate 16. The first output pulse cannot pass through this gate, since the "print" flip-flop P is initially in its 0 state, before the arrival of the first pulse. That is, the pulse applied directly to the AND gate 16 is terminated before the output from P is applied to the gate 16. Where pulses are of relatively long duration, it would be necessary to insert some kind of delay unit, of about one-pulse duration, in the lower input lead to the AND gate 16.

The second output pulse, indicating a long word-space space, has no effect on the flip-flop P (since it is already in the 1 state from the previous pulse), but is passed to the "space" flip-flop S through the AND circuit 16, thereby changing the flip-flop S to the 1 state. Subsequent pulses will have no effect on either of these flip-flops, until they are reset. The "space" flip-flop S is used to actuate the space-bar mechanism on the typewriter or printer. Both of these flip-flops are reset (on the lead marked "R") by the same reset pulse. This is possible because many typewriters will insert a space after a letter, even if the space-bar is depressed while the letter key is held down.

In FIGURE 4B the same kind of scaler is employed as in FIGURE 3B. Actually this is a scale-of-five or a scale-of-thirteen, depending upon which output lead of the fourth flip-flop is used. The "b" lead generates an output pulse on the 5th input pulse, and the "a" lead generates one on the 13th. The "b" lead sets the "print" flip-flop P, and the "a" lead sets the "space" flip-flop S.

When the set and reset inputs of a flip-flop are used, they can usually be reset by a pulse of the wrong polarity on the set input; and set by a wrong pulse on the reset input. This cannot happen in the circuit of FIGURE 4A, if the AND gates 15, 16 pass pulses of only the correct (negative) polarity; and, therefore, diodes $D_1$ and $D_2$ in the FIGURE 4A would be superfluous. Diodes $D_3$ and $D_4$, however, are needed in the circuit of FIGURE 4B.

Figure 5:
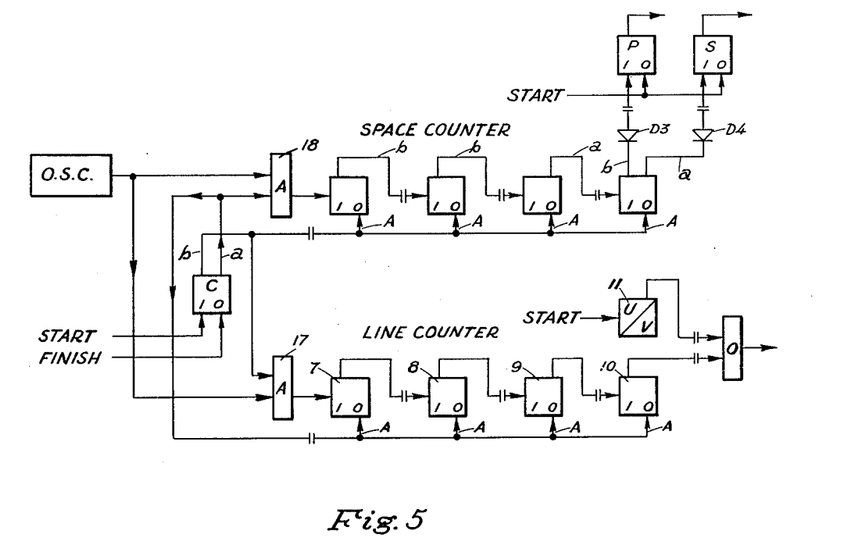
FIGURE 5 is a schematic diagram of a Morse-to-pulse counter.

*Combined Morse-to-pulse converter.*—FIGURE 5 combines the "line" and "space" counters of FIGURES 3B and 4B just described. The following is a description of the operating sequence:

When a Morse character is received, a "start" pulse is generated. This pulse sets a pulse generator capable of producing a pulse of variable duration, e.g., control flip-flop C to 1, resets P and S to 0; and generates an output pulse in the "line" counter through U–V 11. As C changes state from 0 to 1, it generates a pulse on the "b" lead to reset the "space" counter, and, at the same time, generates a steady-state signal to condition the input gate 17 to the "line" counter. If the character being received is a dot, no pulse is generated from the flip-flops of the line counter, and, therefore, only a single pulse (the output from U–V) is passed to the next stage. If the character is a dash, an additional pulse is generated, and two pulses pass to the next stage. At the completion of the Morse character, a finish pulse is generated, which resets C from 1 to 0. This generates a pulse which clears the "line" counter over line "a," and a steady-state signal which conditions the input gate 18 to the "space" counter. If the space is short (one dot) there is no output from the "space" counter. If it is longer (one dash) or long (two dashes), one or two pulses are generated to set either P, or P and S, as described above. The next Morse character repeats this cycle.

*Pulse-to-Binary Converter*

The second stage of the decoder converts the pulses and pulse pairs of the first stage into a binary code. Obviously it is not enough simply to count these pulses, since the number of pulses generated by different letters may be the same. Consider, for instance, D (dash-dot-dot), R (dot-dash-dot), and U (dot-dot-dash). Each of these letters consists of one dash and two dots—a total of four pulses.

Figure 6:
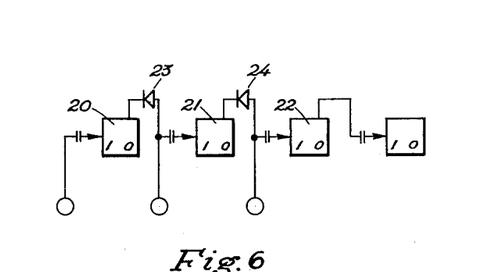
FIGURE 6 is a simplified diagram of a sequence determining circuit used in the Morse-to-binary converter.

FIGURE 6 shows a simplified arrangement by which the order of appearance of the dots and dashes can be distinguished. The first Morse character of a letter is fed to the input of the first flip-flop 20, the second to the second flip-flop 21, the third to the third flip-flop 22. The diodes 23, 24 prevent the input pulses to the second and third flip-flops from effecting the preceding stage.

In the case of the letter D, two pulses (dash) are fed into the first flip-flop, one pulse (dot) into the second, and one pulse (dot) into the third. The state of the counter after each Morse character will be: 0100, 0010, 0001, the final state being the binary representation of decimal 8. The sequence of operation for the letter R is: 1000, 1010, 1001, the final state being the binary equivalent of decimal 9. The sequence for U is 1000, 1100, 1101, the final state being decimal 11.

Extending the counter to six stages, there will be a unique binary equivalent for every letter, numeral, and punctuation mark, as shown in the following table.

As a general rule, the number of stages required in this type of counter will be one more than the number of Morse characters to be decoded (except for punctuation marks). The maximum number of characters in a letter is 4. Of the 4-groups there are four possible codes not used dash-dash-dash-dot (22), the dot-dash-dot-dash (25), dot-dot-dash-dash (27), and dash-dash-dash-dash (30). These could well be used for special symbols and instructions. Among the five- and six-character codes (numerals and punctuation), there are many not used, but these lack the brevity of the ones mentioned.

For numerals, the Morse code uses a five-character code; and, therefore, six binary stages are needed. For punctuation, which uses a six-character code, an exception is made to the general rule. The sixth Morse character, instead of being fed into the sixth stage, is fed back into the first stage, and the resulting binary code is still different from that of any other letter or numeral.

Figure 7:
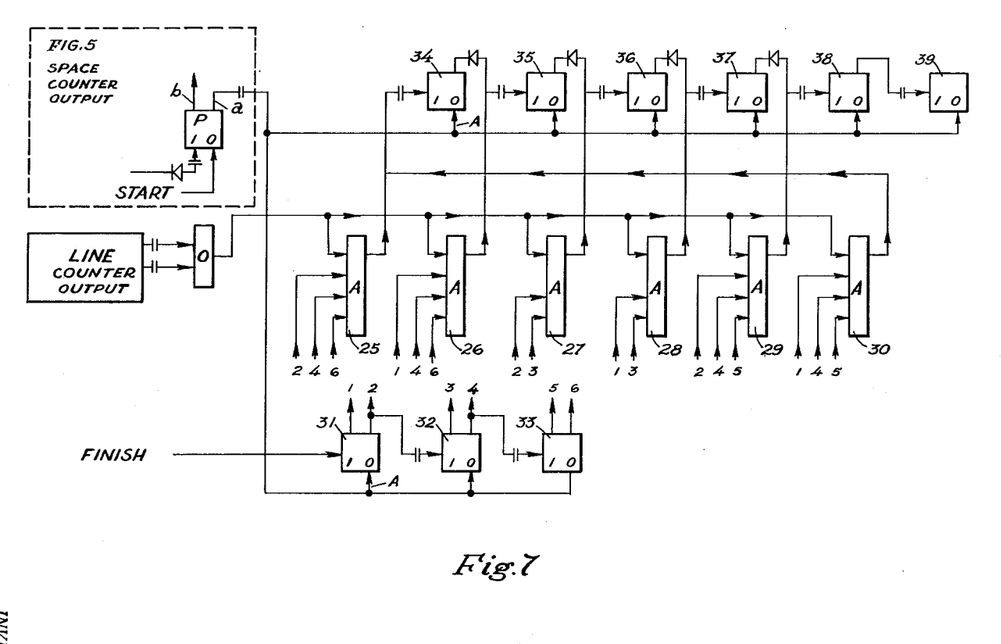
FIGURE 7 is a schematic diagram of the second stage of the Morse-to-binary code converter.

FIGURE 7 shows a practical circuit for this pulse-to-binary counter. The OR output gate of the line counter of FIGURE 5 has been redrawn as indicated. The output pulses from the OR gate are fed simultaneously to six AND gates 25, 26, 27, 28, 29 and 30. These gates are controlled by a three-stage binary counter 31, 32, 33. When the three-stage counter is at 000, the first AND gate 25 is enabled; when it is at 100, the second gate 26 is enabled, and so forth. (The numbers on the AND gate input leads correspond to those on the steady-state output leads of the three-stage counter.) In this way, the output pulses from the "line" counter are fed to the proper leads for input to a six-stage binary counter 34, 35, 36, 37, 38 and 39 shown at the top of the figure. Note that the output from the sixth AND gate 30 is fed to the input of the first stage 34 of the counter.

The sequence of operation is as follows. When the "print" flip-flop, P, from the previous stage (FIGURE 5) is reset by a "start" pulse, it generates a pulse which resets both the three-stage and the six-stage counters. The "start" pulse itself cannot be used for this clearing function, or it would reset the counters after each Morse character, instead of after each completed letter, as required. The P flip-flop, however, is not reset until the first "start" pulse after a completed letter.

When the first Morse character of a letter is received, it generates one or two pulses from the "line" counter, depending upon whether it is a dot or a dash. Since the three-stage binary counter has been reset to 000, only the first stage 25 of the six-stage binary counter is responsive to this pulse or pair of pulses. When the character ends, a "finish" pulse is generated, which advances the three-stage counter to the next binary number, 100, thereby conditioning the second AND gate 26, and permitting the next pulse or pair of pulses to be fed directly

| Morse | Binary | Dec. | Morse | Binary | Dec. |
| --- | --- | --- | --- | --- | --- |
| E . | 100000 | 1 | Free . — . — | 100110 | 25 |
| T — | 010000 | 2 | Q — — . — | 010110 | 26 |
| I . . | 110000 | 3 | Free . . — — | 110110 | 27 |
| N — . | 001000 | 4 | Y — . — — | 001110 | 28 |
| A . — | 101000 | 5 | J . — — — | 101110 | 29 |
| M — — | 011000 | 6 | Free — — — — | 011110 | 30 |
| S . . . | 111000 | 7 | 5 . . . . . | 111110 | 31 |
| D — . . | 000100 | 8 | 6 — . . . . | 000001 | 32 |
| R . — . | 100100 | 9 | 7 — — . . . | 010001 | 34 |
| G — — . | 010100 | 10 | 8 — — — . . | 011001 | 38 |
| U . . — | 110100 | 11 | 9 — — — — . | 011101 | 46 |
| K — . — | 001100 | 12 | 4 . . . . — | 111101 | 47 |
| W . — — | 101100 | 13 | 3 . . . — — | 111011 | 55 |
| O — — — | 011100 | 14 | 2 . . — — — | 110111 | 59 |
| H . . . . | 111100 | 15 | 1 . — — — — | 101111 | 61 |
| B — . . . | 000010 | 16 | 0 — — — — — | 011111 | 62 |
| L . — . . | 100010 | 17 | Colon — — — . . . | 111001 | 39 |
| Z — — . . | 010010 | 18 | Trans. ended . . . — . — | 100101 | 41 |
| F . . — . | 110010 | 19 | Period . — . — . — | 010101 | 42 |
| C — . — . | 001010 | 20 | ? . . — — . . | 001100 | 44 |
| P . — — . | 101010 | 21 | Comma — — . . — — | 001011 | 52 |
| Free — — — . | 011010 | 22 | Semicolon — . — . — . | 101011 | 53 |
| V . . . — | 111010 | 23 | Dash — . . . . — | 000011 | 48 |
| X — . . — | 000110 | 24 | Quote . — . . — . | 010011 | 50 | into the second stage 35 of the six-stage counter. This cycle is repeated until the "space" counter of FIGURE 5 detects a long space (whether it is a letter-space or a word-space). Flip-flop P is then changed from 0 to 1. The next start pulse resets P, clears both counters, and the process is repeated for the next group of characters.

It was mentioned above in connection with the univibrator of FIGURES 3 and 5, that the delay time should be adjusted to about the same duration as the time between pulses of the oscillator when it is operating at its maximum frequency. The reason for this can be understood from FIGURE 7 and the preceding description of its operating cycle. If there is no delay time, the "start" pulse which indicates a dot would be fed to the circuits of FIGURE 7 before the same "start" pulse had time to clear them. On the other hand, this delay cannot be too long, for the three-stage counter 31—33 of FIGURE 7 is advanced by each "finish" pulse, and, if the duration of a dot were very short, the "finish" pulse might advance the three-stage counter before the arrival of the dot pulse, thereby causing the dot pulse to be fed into the wrong stage.

*Partial Memory*

The operating time of the decoder is limited only by the computer components, and these have been designed to operate at speeds well over a megacycle. Therefore, the only practical limitation on receiving speed is imposed by the printing mechanism. In the decoder, as described thus far, the time allowed for printing extends from the 5th pulse gated into the "space" counter to the "start" pulse of the following Morse character. If the spaces are of ideal duration (gating 9 pulses for a letter-space and 18 for a word-space), this would be equivalent to a printing time of about one and one-third dots for a letter-space—and it is this shorter letter-space which determines the maximum receiving speed. If the spacing is not of ideal duration, the printing time can be as short as one-third of a dot.

To overcome this speed limitation—that is, to increase the printing time by distributing it among the letters with more than two characters, standard memory circuits can be incorporated in the decoder. These memories would be "written" into at the conclusion of each letter, and read out at periodic intervals, corresponding to the speed at which the code is being received. Such memories give the printing mechanism time to catch up, while letters of more characters are being decoded. These memories, however, are not part of the invention and, therefore, are not described in detail.

With a slight change in circuitry it is possible to incorporate a "partial" memory, which gives an increase in the printing time, and, therefore, a corresponding increase in the speed capability of the decoder. This memory has been designed around the shortest of the Morse letters, E, which consists of a single dot. The worst possible case, the shortest printing time for a letter, is had when the letter E is followed by another E. However, by terminating the printing time with the "finish" pulse of the E, instead of with the "start" pulse the printing time can be extended for the duration of the E—one dot, for an ideal code.

Figure 8:
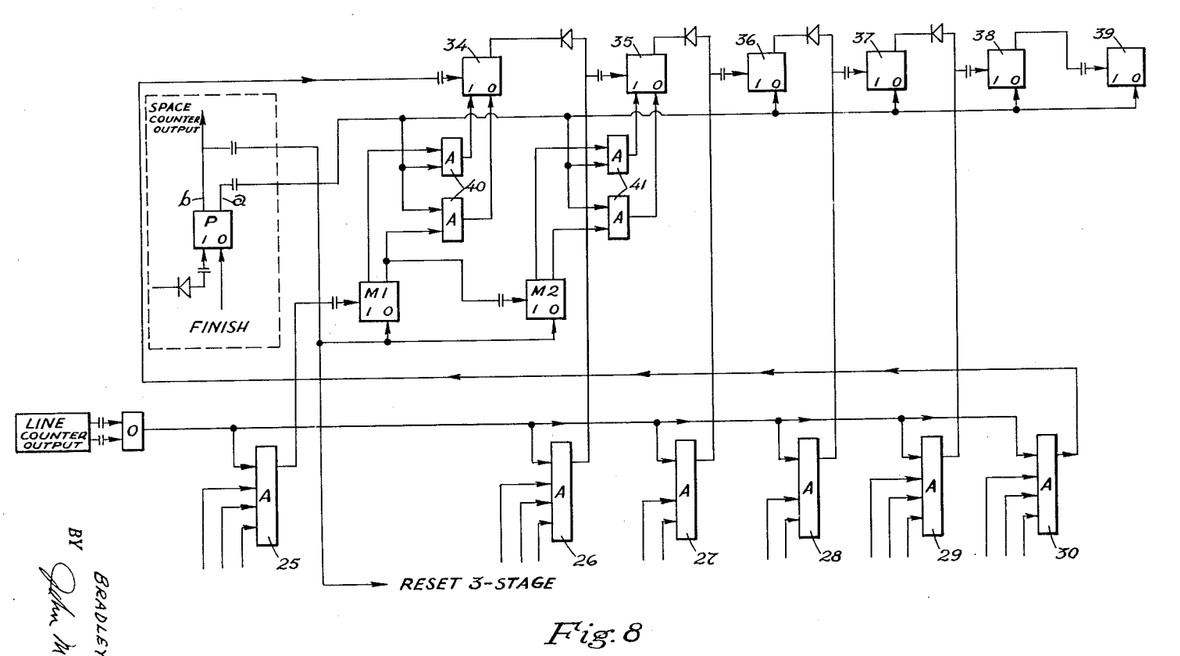
FIGURE 8 is a schematic diagram similar to FIGURE 7 and including memory circuits for providing a partial memory of the binary code.

FIGURE 8 shows the circuit of this partial memory. It is basically the same as FIGURE 7, except for the addition of M1 and M2, the partial memory flip-flops. These two flip-flops control the resetting of the first two stages 34, 35 of the six-stage binary counter; and this counter is reset on a "finish" pulse to P, rather than on a "start" pulse, as in FIGURE 7.

The operating cycle is as follows. The pulse or pulse pair (dot or dash pulses) are fed from the "line" counter over AND gate 25 to the memory pair, M1–M2—setting this pair to either 10 for a single-pulse dot, or 01 for a double-pulse dash. At the termination of the first Morse character, a "finish" pulse is generated. This pulse advances the three-stage counter (not shown) just as it did in FIGURE 7. It also resets P from 1 to 0. As P resets, it generates a pulse on its "a" lead, which is fed directly to the stages 36, 37, 38 and 39, of the counter, resetting them. The same resetting pulse is fed to two pairs of AND gates 40, 41 controlled by the M1–M2 pair. Thus, the first two stages of the six-stage counter are reset to the same state (10, or 01) as the partial memory pair. The second, third, etc. Morse characters are fed to the stages 35, 36, etc. as they were in FIGURE 7. The sixth Morse character (punctuation), however, is not fed to the partial memory input, as was the first character, but back into the first stage of the six-stage counter.

At the end of a completed letter, the fifth pulse into the space counter generates the pulse that sets P from 0 to 1. In so changing, P generates a pulse on its "b" lead, which resets both the partial memory pair, and the three-stage binary counter, preparing them for reception of the first Morse character of the next letter. Both the memory pair and the three-stage counter can be reset at this time, since they are not needed for the printing operation which begins as P changes from 0 to 1.

*Code Speed Detection*

The determination of code speeds, and the consequent adjustment of the oscillator frequency is also designed around digital components. It is, however, partially adaptable to analogue techniques.

Adjustment of the oscillator is divided into two functions: fine frequency adjustment and coarse frequency adjustment.

*Fine frequency adjustment.*—A dash is used as the standard of measurement, since there is no difficulty about the shortness of a dot—the "start" pulse is sufficient to indicate its presence. Presuming the coarse frequency has been so adjusted that a dash will generate 5 to 12 pulses in the "line" counter, the oscillator is regulated so that nine (the ideal number) pulses are generated in the counter. The detector uses a "finish" pulse to read the condition of the line counter, and to make the required correction. There follows a chart of the operating sequence of the "line" counter, which, it will be remembered, is a scale-of-five counter:

| Coarse frequency increase | Fine frequency control | Coarse frequency decrease |
|---|---|---|
| 0 00000 Inc. X3 | 5 11010 0 | 13 11001 Dec. X2 |
| 1 11100 0 | 6 01010 Inc. 1 | 14 01001 Dec. X2 |
| 2 01100 0 | 7 10010 Inc. 1 | 15 10001 X2 |
| 3 10100 0 | 8 00010 Inc. 1 | 16 00001 X2 |
| 4 00100 0 | 9 11110 0 | 17 11101 X3 |
| | 10 01110 Dec. 1 | 18 01101 X3 |
| | 11 10110 Dec. 1 | 19 10101 X3 |
| | 12 00110 Dec. 1 | 20 00101 X3 |
| | | 21 11011 X3 |
| | | 22 01011 X3 |
| | | 23 10011 X3 |
| | | 24 00011 X3 |
| | | 25 11111 X3 |
| | | 26 01111 X3 |
| | | 27 10111 X3 |
| | | 28 00111 X3 |

The center column of the chart deals with the pulses (5–12) which concern fine frequency control. First is listed the pulse number, then the condition of the "line" counter after the pulse is received, and finally the correction that is to be made. It should be noted that for pulse 5 no change is made. This is because the fifth pulse might be generated by a dot that is too long. If it is actually a dash generating only five pulses, then the condition will be corrected by the coarse frequency control. All the other corrections consist in varying the frequency of the oscillator to give only one more (or less) pulse for the same length code character. Thus, all changes in the fine frequency control are made gradually; and a single character which is too long or too short will not cause a large deviation from the average length.

Figure 9:
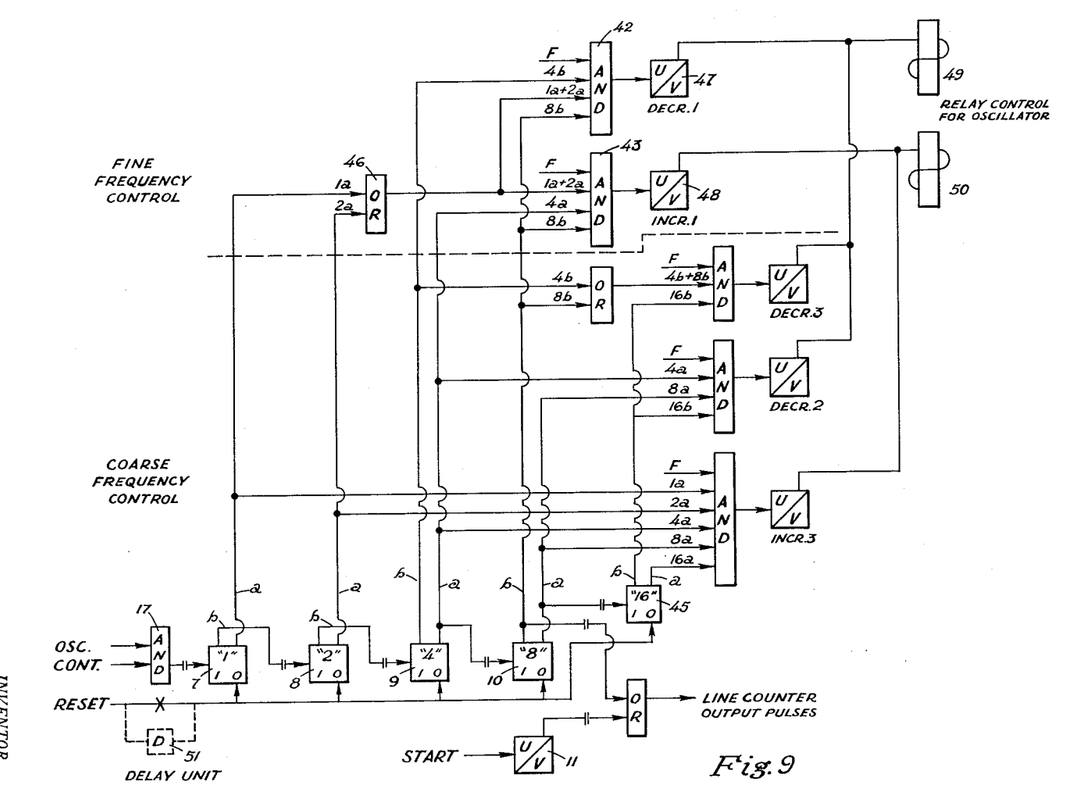
FIGURE 9 is a schematic diagram of a code speed detection circuit.

The upper part of FIGURE 9 (above the dotted line)

shows the circuits which fulfill the requirements for fine frequency control. The flip-flops at the bottom 7, 8, 9 and 10 for the binary notations "1," "2," "4" and "8" are the same ones as shown in the line counter of FIGURES 3 and 5; and the univibrator 11 of FIGURE 5 is shown at the bottom of FIGURE 9. An additional flip-flop 45 for the binary "16" has been added for purposes of coarse frequency control. According to the chart, an increase of 1 pulse is required for the condition when flip-flop 10 is "on" (output 8b), flip-flop 9 is "off" (4a), and either flip-flop 7 or flip-flop 8, or both, are "off" (1a+2a). Under these conditions, a "finish" pulse F will pass through the gate 43:

Incr. 1=(F)(1a+2a)(4a)(8b)

The conditions for a decrease of 1 pulse are met by:

Decr. 1=(F)(1a+2a)(4b)(8b)

If it should be desired to make a correction when the "line" counter reads 5, then the line from the OR gate 46 (1a+2a) should be disconnected from the "Increase 1" circuit 48.

After a finish pulse passes through one of these two gates 42, 43, it energizes a univibrator 47 or 48 in the output of which is, for example, a stepping relay 49 or 50, connected to a potentiometer (not shown). The potentiometer controls the frequency of the oscillator. The univibrator is adjusted to change the frequency by approximately one pulse. This adjustment will vary, of course, according to the setting of the coarse frequency control. If a given change of resistance causes a certain change in frequency when the oscillator operates at 50 p.p.s., the same change in resistance will cause a different change in frequency when the oscillator operates at 300 p.p.s. Because of the relatively narrow frequency range of the oscillator in this application, these differences should not be important.

The coils of stepping relays 49, 50 are shown in FIGURE 9. For increasing and decreasing, the steppers could feed into a computing differential gear, and the output of the gear into a potentiometer shaft. Or, the coils could actuate $dp/dt$ relays which change the polarity of a small D.C. motor, as used to drive potentiometers in analogue circuits.

Since the "finish" pulse reads the state of the line counter, it is important that this counter is not cleared before the "finish" pulse can read it. Resetting of the line counter is accomplished (FIGURE 5) indirectly by the finish pulse, through control flip-flop C. If the finish pulse is short, compared to the switching time of the control flip-flop, no difficulty will be encountered. If it is not, there is need for a delay 51 in the reset lead of the line counter as suggested by dotted lines, equal to a bit less than one pulse, when the oscillator is operating at its maximum frequency.

Some measure of control can be exercised over the "space" counter by including a similar fine frequency control. The coarse frequency control of the "space" counter would be handled by the coarse frequency control of the "line" counter. If this is done, a separate oscillator would be used for the "space" counter.

*Coarse frequency control.*—This is accomplished by doubling, tripling, etc. the oscillator frequency, according to the requirements of the above chart. The only increase (tripling, as indicated by ×3) is made when the "line" counter shows all flip-flops in the 0-state. All other circuit conditions are indicated on the output leads to the various gates of FIGURE 9. The univibrators are adjusted to stay "on" for correspondingly longer periods, allowing a motor or self-stepping relay to accomplish the required changes. Where the code is being received very rapidly, the full change may not be accomplished before the next series of pulses comes into the "line" counter, but this is of no consequence.

Figure 10:
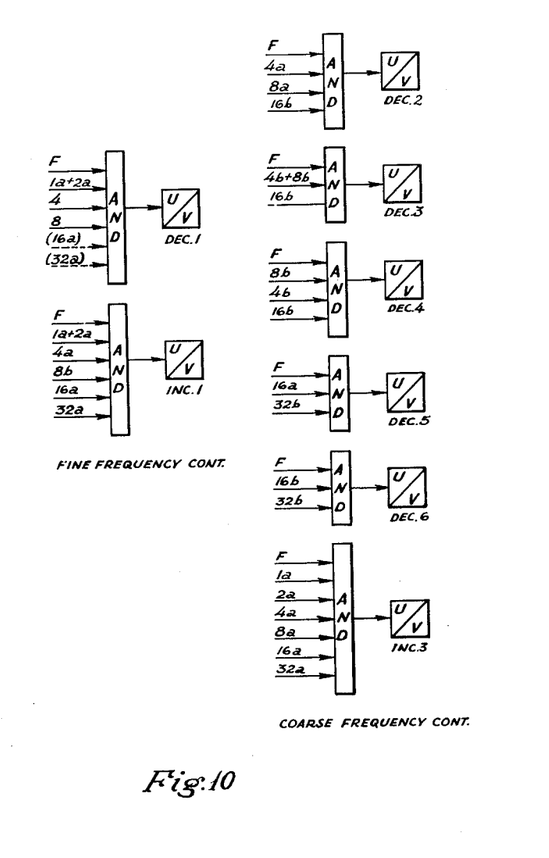
FIGURE 10 is similar to FIGURE 9, including circuitry for increasing the range of speed detection.

The circuits of FIGURE 9 give a fairly limited range of receiving speeds (about 3-to-1). They are shown mainly for purposes of illustrations. In order to increase the range, additional flip-flops and gates are added. FIGURE 10 illustrates this. With the addition of one more flip-flop, for the binary notation "32," the range can be increased to about 7-to-1. The complementary output of each additional flip-flop must be added to the gate to "Increase ×3," since this is done only when the entire counter is at 0.

It is not necessary to make similar provisions for the gates to "Decrease 2," "Decrease 3," etc., because all of these univibrators are parallel supplies for the relay coils; and, in the case of overlapping (i.e., when two are turned "on" at the same time) the one with the longer period will prevail.

*Variation.*—A method more closely allied to analogue methods can be used for the coarse frequency control. Instead of reading the "line" counter, a separate counter may be added to the decoder (and this counter may be straight binary code). Pulses to the "line" counter are also fed to this coarse frequency control counter. The motor which operates the resistance (potentiometer) in the oscillator also operates an analogue-to-digital converter. The motor is energized during the spaces between code characters; and the analogue-to-digital converter is so wired that it "seeks" the binary code for 9 pulses—that is, the motor is not energized when the counter reads 9. Like the coarse frequency control just described, the motor increases the frequency only for the condition when all flip-flops of the counter read 0. If the fine frequency control described above is included, the motor would also be de-energized for pulses 1 through 12, with the fine frequency control taking over for pulses 5 through 12. If the fine frequency is not used, it is still necessary that the motor be de-energized for pulses 1, 2, 3 and 4, since these pertain to a dot; and the control of frequency is centered around the length of a dash.

Printing

No specific printer is designed for the novel decoder; and, consequently no network is included to convert the binary code to a specific letter on the printer. The network will depend on the printer used; and, in any event, it would consist of a standard diode network, or the equivalent.

With the advent of high-speed, dry-ink printers, there is no practical upper limit to receiving speeds, where mechanical printers are used, certain requirements must be observed.

If a full memory is not used, there will be difficulty in shifting the carriage to a new line, since certain letters will be lost, during the process. Therefore, a printer with a tape (not requiring carriage return) would be required. If, however, the sender is sending code specifically to this receiving device, one of the "spare" characters mentioned in the table could be sent to indicate carriage return. Two others could be used to indicate a shift to upper case and a return to lower case.

If the printer is of a type which does not insert a space, while a letter key is depressed, some modification must be made in flip-flop P and flip-flop S of FIGURES 4 and 5, so that P is reset before S. For example, S could be used to reset P.

While the foregoing description sets forth the principles of the invention in connection with specific apparatus, it is to be clearly understood that this description is made only by way of example and not as a limitation of the scope of the invention as set forth in the objects thereof and in the accompanying claims.

What I claim is:

1. A Morse code-to-binary code converter, comprising means including a pulse generator for generating "start" and "finish" pulses identifying respectively the beginning and end of a Morse signal element, means including a signal element counter coupled to said generator and adapted to produce a given number of pulses in response to "start" and "finish" pulses indicative of a "dot" and a different given number of pulses in response to "start" and "finish" pulses indicative of a "dash," a multi-stage binary counter, a control gate for each binary counter stage, means coupled to each of said gates and responsive to successive "finish" pulses for conditioning said gates in sequence, said gates being coupled to the output of said signal element counter, and means including a conditioned gate responsive to pulses indicative of a "dot" or "dash" for altering the state of the associated counter stage, whereby the final states of the counter stages constitute a binary code equivalent of a Morse code letter.

2. The converter according to claim 1, wherein said means including said signal element counter produces one pulse indicative of a dot and two pulses indicative of a dash.

3. The converter according to claim 2, wherein said multi-stage binary counter comprises six stages for a six digit code, each stage comprising logic block means adapted to be triggered alternately between two states of operation, said control gates comprising respectively logic AND block means each having a plurality of inputs, said signal element counter output being coupled to one of the inputs of each of said AND block means, and said conditioning means being coupled to the remaining of said inputs.

4. A Morse-to-binary code converter, comprising means including a pulse generator for generating "start" and "finish" flanking pulses identifying respectively the beginning and end of a Morse signal element, first means for producing a given number of pulses in response to "start" and "finish" pulses indicative of a dot and a different given number of pulses in response to "start" and "finish" pulses indicative of a dash, second means for producing a discrete number of pulses in response to a space between consecutive letters and a different discrete number of pulses in response to a space between consecutive words, a multi-stage binary counter coupled to the output of said first means, means including a sequence determining circuit coupled to the respective stages of said binary counter for conditioning the stages in orderly sequence, the conditioned stage being operative in response to the output from said first means and the final condition of the stage being dependent on the number of pulses applied thereto, said sequence determing circuit means being coupled to said pulse generator means and operative in response to said "finish" pulses, upon the termination of each signal element, to shift the conditioned stage to the next succeeding one, whereby the final condition of the binary counter constitutes a binary code equivalent of a Morse code letter, and means for applying the output of said second means to clear said binary counter and said sequence determining circuit upon the completion of a letter.

5. The converter according to claim 4, wherein said first means comprises an oscillator for producing pulses at a given pulse repetition rate, a coincident gate having two inputs, means coupling said oscillator to one of said coincident gate inputs, means including a gate pulse generator capable of producing pulses of varying duration coupled to the other input of said coincident gate, means for applying said "start" pulse to said gate pulse generator means for initiating a gate control pulse, and means for applying said "finish" pulse to said generator means for terminating said gate control pulse, whereby the width of said gate control pulse determines the number of oscillator pulses gated through said coincident gate, and pulse counter means coupled to the output of said coincident gate including scaling means to produce said given number of output pulses in response to a predetermined number of input pulses.

6. The converter according to claim 5, wherein said coincident gate comprises logic AND block means, and said generator means being capable of producing pulses of varying duration comprises a flip-flop circuit.

7. The converter according to claim 5, and further comprising logic OR circuit means having two inputs, means for applying said "start" pulses to the one input of said OR circuit means, the output of one pulse from said OR circuit means indicating a dot character, said oscillator having a pulse repetition rate such that ideally nine pulses are gated through said coincident gate in response to "start" and "finish" pulses indicative of a dash, and said pulse counter scaling means producing one output pulse in response to five input pulses, whereby said OR circuit means produces a total of two output pulses corresponding to a dash.

8. The converter according to claim 4, wherein said first means comprises an oscillator for producing pulses at a given pulse repetition rate, a multi-stage pulse counter including means for producing output pulses, means for gating said oscillator pulses to said counter means, a coincident gate, and means coupling the output pulses of predetermined stages of said pulse counter means to said coincident gate, whereby an output pulse is produced only when said predetermined stages are operating simultaneously.

9. The converter according to claim 8, wherein the repetition rate of said oscillator is such that ideally nine pulses are gated through said gating means in response to "start" and "finish" pulses indicative of a dash, and means for selecting the outputs from said pulse counter means so that coincidence exists only on the first and fifth pulses applied thereto, the first output pulse from said coincident gate indicating a dot character and a total of two output pulses indicating a dash character.

10. The converter according to claim 7, wherein said second means comprises a second coincident gate coupled to the outputs of said oscillator and said gate pulse generator means respectively, and a second pulse counter coupled to the output of said second coincident gate, said second pulse counter constituting a space counter, said gate pulse generator means comprising a flip-flop circuit having a pair of outputs coupled respectively to said coincident gates, whereby while said flip-flop is generating an output on one lead the other output is inactive and vice versa, said pulse repetition rate is such that ideally nine pulses are gated through said second coincident gate for a space between letters, said second pulse counter including scaling means so as to produce a first output in response to five input pulses, a bistable print control circuit having a pair of inputs and a pair of outputs, a first of said outputs supplying a printing signal, the second output supplying a clearing signal to said binary counter, means for applying said first output from said second counter to one of said print control circuit inputs, said print control circuit including means for producing its said first output in response to the first output from said second counter, and means for applying one of said flanking pulses to the other input of said print control circuit, and in response thereto said print control circuit means produces its said second output.

11. The converter according to claim 10, wherein said oscillator pulse repetition rate is such that ideally eighteen pulses are gated through said second coincident gate for a space between words, and said second pulse counter including scaling means to produce a second output in response to thirteen input pulses.

12. The converter according to claim 11, wherein said sequence determining circuit comprises a three stage flip-flop counter, each stage comprising a pair of outputs, each stage of said binary counter including AND gate means coupled to at least two outputs of different stages of said flip-flop counter, means for applying said "finish" pulses to the first stage of said flip-flop counter, said flip-flop counter and AND means including means to condition for operation only the first of said AND gate means during the initial condition of said flip-flop counter, and in response to each "finish" pulse means to condition for operation only the next succeeding AND gate means, the sequence of operation continuing until either all the AND gate means have been conditioned or the flip-flop counter is returned to its initial condition by said second output from said print control circuit.

13. The converter according to claim 4, wherein the first two stages of said binary counter include memory circuits, means for applying the output from said first means to said memory circuits when the first binary counter stage is conditioned by said sequence determining circuit, means for reading the memory information into said first two stages of said binary counter while simultaneously clearing the remaining stages of said binary counter, and means for subsequently clearing said first and second stages.

14. The converter according to claim 13, wherein said memory circuits comprise first and second flip-flop circuits each having a pair of outputs, the outputs of said first flip-flop circuit being coupled over respective AND gate means to first and second inputs of said first binary counter stage respectively, the outputs of said second flip-flop circuit being coupled over respective AND gate means to first and second inputs of said second binary counter stage, said first and second binary counter stages including means responsive to said first and second inputs for setting the respective stages in one state and resetting the stages in the initial state respectively, said reading means comprises a circuit responsive to one of said flanking pulses for producing a memory control output to each of said AND gate means, whereby the AND gate means conditioned by the state of said first and second memory flip-flops respond to said memory control output to apply outputs on the appropriate inputs of said first and second binary stages, whereby the final state of said first and second binary stages corresponds to the state of said memory flip-flops.

15. The converter according to claim 12, and further comprising a pair of bistable memory circuits connected in tandem, means for applying the output from the first of said AND gate means to the first of said memory circuits, whereby the state of each memory circuit depends on the number of inputs applied to said first memory circuit, means for reading the memory information into the first two stages of said binary counter while said record output of said print control circuit simultaneously clears the remaining stages of said binary counter, and means for subsequently clearing said first and second binary stages.

16. The converter according to claim 15, wherein each of said bistable memory circuits have a pair of outputs, the outputs of one bistable circuit being coupled over respective AND gate means to first and second inputs of the first binary counter stage respectively, the outputs of the other bistable circuit being coupled over respective AND gate means to first and second inputs of the second binary counter stage, said outputs coupled to said first and second inputs of said first and second binary counter stages including means to set the respective stages in one state and reset the stages in the initial state respectively, said reading means comprising said bistable print control circuit, the second output of said print control circuit being produced by the application of said "finish" pulse thereto; and coupled to each of said AND gate means associated with said memory circuits, whereby the AND gate means conditioned by the state of said bistable memory circuits respond to said second output of said print control circuit to apply outputs on the appropriate inputs of said first and second binary stages, and means including said first output of said print control circuit for resetting said memory circuits and said sequence determining circuit.

17. A converter for converting Morse signal elements to pulses, comprising a control logic circuit having a pair of inputs and a pair of outputs, means for generating "start" and "finish" pulses at the beginning and end of each Morse signal element respectively, the "start" and "finish" pulses being applied to the pair of inputs respectively of said control logic circuit, means including a signal element counter coupled to said control logic circuit and adapted to produce one pulse in response to "start" and "finish" pulses indicative of a dot and two pulses in response to "start" and "finish" pulses indicative of a dash, and space counter means coupled to said control logic circuit and adapted to produce one pulse in response to a space between the "finish" pulse of one letter and the "start" pulse of the next succeeding letter and two pulses in response to a space between the "finish" pulse of one word and the "start" pulse of the next succeeding word.

18. The converter according to claim 17, wherein said means including the signal element counter comprises first AND gate means having a pair of inputs, means for applying said "start" and "finish" pulses to one of said inputs, means including a pulse generator adjusted to a frequency for producing three pulses for a dot of ideal length and nine pulses for a dash of ideal length, means for applying the output of said generator means to the other input of said AND gate means, a plurality of flip-flop circuits connected in tandem, the first of said flip-flop circuits being connected to the output of said AND gate means, second AND gate means having a plurality of inputs, a corresponding number of outputs from certain respective flip-flop circuits coupled to the inputs of said second AND gate means, said certain flip-flop circuits being selected so that the outputs therefrom are coincident upon application of the first and fifth pulses to the first of flip-flop gate means, whereby said second AND circuit produces one output pulse indicative of a dot in response to the first applied pulse and two output pulses indicative of a dash after the fifth applied pulse.

19. A signal element counter for use in a Morse code converter and adapted to produce one output pulse for a dot and two output pulses for a dash, means for generating "start" and "finish" pulses identifying the beginning and ending of each Morse signal element, first AND gate means having two inputs, means for applying "start" and "finish" pulses to one of said inputs, means including a pulse generator adjusted to a frequency for producing three pulses for a dot of ideal length and nine pulses for a dash of ideal length, means for applying the output of said generator means to the other input of said AND gate means, a plurality of flip-flop circuits connected in tandem, the first of said flip-flop circuits being connected to the output of said AND gate means, the last of the flip-flop circuits being connected to produce one output pulse in response to the fifth input pulse, OR circuit means having two inputs, means for applying the output from said flip-flop circuits to one of said inputs, a delay circuit having its output connected to the other input of said OR circuit means, the delay produced by said delay circuit being approximately equivalent to the period between pulses generated by said pulse generator means, and means for applying said "start" pulses to said delay circuit means, whereby said OR circuit produces one output pulse indicative of a dot in response to the first applied pulse and two output pulses indicative of a dash after the fifth applied pulse.

20. A space counter for use in a Morse code converter and adapted to produce one output pulse for a space between letters and two output pulses for a space between words, means for generating "start" and "finish" pulses identifying the beginning and ending of each Morse signal element, first AND gate means having two inputs, means for applying "start" and "finish" pulses to one of said inputs, means including a pulse generator adjusted to a frequency for producing nine pulses for a space of ideal length between letters and eighteen pulses for a space of ideal length between words, means for applying the output of said generator means to the other input of said AND gate means, a plurality of flip-flop circuits connected in tandem, the first of said flip-flop circuits being connected to the output of said AND gate means, second AND gate means having a plurality of inputs, a corresponding number of outputs from certain respective flip-flop circuits coupled to the inputs of said second AND gate means, said certain flip-flop circuits being selected so that the outputs therefrom are coincident upon application of the 5th and 13th pulses to the first of said flip-flop circuits, whereby said second AND gate means produces successive output pulses in response to said coincident input pulses, a print flip-flop circuit connected to the output of said second AND gate means, a third AND gate means having two inputs, the output from said second AND gate means being divided and applied respectively to one of said inputs of said third AND circuit, and to said print flip-flop circuit, the output from said print flip-flop circuit being coupled to the other input of said third AND gate means, means initially conditioning the print flip-flop circuit so that in response to the first applied pulse its output is sufficiently delayed so as not to enable said third AND gate means, the output from said print flip-flop, however, conditioning said third AND gate means so that in response to the second output pulse from said second AND circuit said third AND gate produces an output, a space flip-flop circuit coupled to the output of said third AND gate means, means initially conditioning said space flip-flop so as to produce an output in response to an output from said third AND gate means, whereby the first and second output pulses from said second AND gate means correspond to a letter space and word space, respectively.

21. A space counter for use in a Morse code converter and adapted to produce one output pulse for a space between letters and two output pulses for a space between words, means for generating "start" and "finish" pulses identifying the beginning and ending of each Morse signal element, first AND gate means having two inputs, means for applying "start" and "finish" pulses to one of said inputs, means including a pulse generator adjusted to a frequency for producing nine pulses for a space of ideal length between letters and eighteen pulses for a space of ideal length between words, means for applying the output of said generator means to the other input of said AND gate means, a plurality of flip-flop circuits connected in tandem, the first of said flip-flop circuits being connected to the output of said AND gate means, the last of the flip-flop circuits having two outputs, one output producing a pulse in response to the 5th input pulse and the other output producing a pulse in response to the 13th input pulse, a print flip-flop circuit connected to said output producing a pulse on the 5th input pulse, and a space flip-flop circuit connected to the output producing a pulse on the 13th input pulse, means conditioning said print and space flip-flop circuits respectively to produce an output pulse in response to an input pulse.

References Cited in the file of this patent

UNITED STATES PATENTS

| | | |
|---|---|---|
| 2,734,684 | Ross | Feb. 14, 1956 |
| 2,868,455 | Bruce | Jan. 13, 1959 |
| 2,894,067 | Hausman | July 7, 1959 |

UNITED STATES PATENT OFFICE
CERTIFICATE OF CORRECTION

Patent No. 3,038,030                                        June 5, 1962

Bradley Murray

It is hereby certified that error appears in the above numbered patent requiring correction and that the said Letters Patent should read as corrected below.

Column 15, line 21, for "circuit" read -- gate means --; line 22, before "produces" insert -- means --.

Signed and sealed this 22nd day of January 1963.

(SEAL)
Attest:

ERNEST W. SWIDER                                        DAVID L. LADD
Attesting Officer                                            Commissioner of Patents